United States Patent
Williams et al.

[11] Patent Number: 5,951,751
[45] Date of Patent: Sep. 14, 1999

[54] FLOWABLE FILL COMPOSITION AND METHOD

[75] Inventors: Devon Williams, Fort Worth, Tex.; Michael Eliasen, Las Vegas, Nev.; Robert A. Derks, Scottsdale, Ariz.

[73] Assignee: Chemical Lime Company, Fort Worth, Tex.

[21] Appl. No.: 09/178,850

[22] Filed: Oct. 26, 1998

[51] Int. Cl.⁶ .............................. C04B 28/22; E02D 3/12
[52] U.S. Cl. .................... 106/706; 106/710; 106/793; 106/811; 106/817; 106/900; 405/266; 405/267
[58] Field of Search ................................. 106/706, 710, 106/793, 811, 817, 900; 405/266, 267

[56] References Cited

U.S. PATENT DOCUMENTS

| | | | |
|---|---|---|---|
| 2,564,690 | 8/1951 | Havelin et al. | 106/710 |
| 2,698,252 | 12/1954 | Havelin et al. | 106/706 |
| 2,815,294 | 12/1957 | Havelin et al. | 106/706 |
| 3,076,717 | 2/1963 | Minnick | 106/710 |
| 4,018,619 | 4/1977 | Webster et al. | 106/710 |
| 4,084,381 | 4/1978 | Cain et al. | 405/266 |
| 4,105,463 | 8/1978 | Angelbeck | 106/710 |
| 4,374,672 | 2/1983 | Funston et al. | 106/97 |
| 4,871,283 | 10/1989 | Wright | 405/263 |
| 5,118,219 | 6/1992 | Walker, Jr. | 405/128 |
| 5,542,977 | 8/1996 | Hanst | 106/710 |

*Primary Examiner*—Anthony Green
*Attorney, Agent, or Firm*—Charles D. Gunter, Jr.

[57] ABSTRACT

A flowable fill composition is shown which is prepared by mixing together a lime component, a pozzolanic component, aggregate material and water. The composition has a set compressive strength after 28 days of 2000 psi or less and is characterized by the substantial absence of cement or other self-setting adhesive components.

11 Claims, 1 Drawing Sheet

FLOWABLE FILL COMPOSITION AND METHOD

BACKGROUND OF THE INVENTION

1. Field of the Invention

The present invention relates generally to flowable fill materials capable of forming stable backfills and to controlled low-strength mixtures which are initially fluid, self-leveling and which can be placed in the earth in various earth filling operations.

2. Description of the Prior Art

Controlled Low-Strength Mixtures (CLSMs), or flowable back-fills, were first developed in the early 1970s. Such materials have been used, for example, to fill narrow or remote trenches in the earth, as pipe bedding materials. A material process was patented by the Detroit Edison Company, of Detroit, Mich., which produced what was then called a controlled density fill (CDF) marketed as K-KRETE. K-KRETE exhibited a relatively low strength compared to conventional concrete, about 100 psi or less, but enjoyed some commercial success. Several similar products were marketed under the trade designations M-CRETE, S-CRETE, FLOWABLE FILL, FLASH FILL, ONE-SACK MIX, and FLOWABLE GROUT. These materials featured low cement contents, fine-graded aggregates, and easily handled liquid textures. One stabilized fill material marketed by the Detroit Edison Company is described in U.S. Pat. No. 4,374,672, issued Feb. 22, 1983. The product was comprised of 45–80% fly ash, 1–6% cement and 20–50% water. The material could be positioned under water to form a continuous causeway, or the like.

The concrete industry has now set standards for the properties of CLSMs. As compared to other types of construction materials, these materials have been tentatively designed as having set compressive strengths after 21 days of 1200 psi or less, and are commonly required to have strengths less than 300 psi to be considered easily removable.

Controlled Low-Strength Mixtures are used largely for a variety of structural and protective applications. A CLSM is typically very fluid, and therefore is self-leveling and easy to place in narrow or remote trenches. As they are self-setting and hardening, CLSMs also eliminate the need to refill trenches in an expensive and labor-intensive thin-layer process. The ingredient flexibility in CLSM mix designs permits their customization for thermal or noise insulation needs, as well.

The controllable properties of CLSMs have also made them a preferred pipe bedding. CLSMs do not settle or shrink, and thus provide consistent, durable support for large, expensive sewer pipes placed within them. The fill will also serve as a ballast and water barrier, protecting pipes from internal loads and external water damage.

The water resistance characteristics of CLSMs make them suitable candidates for erosion and environmental control projects. Numerous embankments and stilling basins have been lined with CLSM, as well as culvert and abutments about old bridges.

A need exists therefore for a CLSM which does not require mechanical compaction, which can be provided as a liquid product and which can be handled as a liquid.

A need also exists for a CLSM which is self-hardening, requiring only that the composition be left in place to achieve the desired strength and mechanical properties.

One object of the present invention is to provide such a CLSM which does not contain cement or other self-setting adhesive products.

Another object of the invention is to provide a CLSM which can be poured into a confined space, such as a narrow trench, without premature setting or hardening.

Another object of the invention is to provide a CLSM which has homogeneous and consistent mechanical properties which exceed those of lime-soil mixtures alone.

Another object of the invention is to provide a CLSM which can be used as an insulating thermal fill.

Another object of the invention is to provide a CLSM which can be used as a moisture barrier in soil.

Another object of the invention is to provide a CLSM which can be used as a structural backfill in underground mining.

SUMMARY OF THE INVENTION

Like other lime-containing cementitious materials, the lime-based CLSMs of the present invention are the result of a pozzolanic reaction between lime and a reactive admixture. However, this present process is unique in that the pozzolanic product does not require mechanical compaction; it is a liquid product placed and handled as a liquid. The CLSM is self-hardening, requiring only to be left in place to achieve its desired strength and mechanical properties. It uses lime, mineral aggregates (containing soil or not), fly ash, and whatever other textural or chemical modifiers are desired. One novel aspect of the CLSMs of the invention is that they do not require cement or other self-setting adhesive products to achieve these desired objectives.

The preferred controlled low strength material of the invention forms a flowable fill composition comprising:

from about 1 to 15% by weight of a lime component;

from about 2 to 45% by weight of a pozzolanic component;

from about 20 to 95% by weight of an aggregate component;

from about 10 to 20% by weight water;

wherein all weight percentages are percent by weight of the total flowable fill composition including the water content, the composition being further characterized as having a set compressive strength after 21 days of 2000 psi or less, preferably about 1200 psi or less, and by the substantial absence of cement or other self-setting adhesive components.

The method of producing and placing the flowable fill material of the invention includes the steps of preparing a flowable fill composition as previously described by mixing together the respective components and then placing the flowable fill material so produced in an earthen opening while it is still in the flowable state. Preferably, the flowable fill material is prepared by mixing together lime, fly ash, aggregate and water in predetermined portions of approximately 5 to 15% by weight lime, 10 to 45% by weight fly ash, 50 to 70% by weight aggregate and 10 to 20% by weight water.

Additional objects, features and advantages will be apparent in the written description which follows.

DETAILED DESCRIPTION OF THE INVENTION

Figure 1:
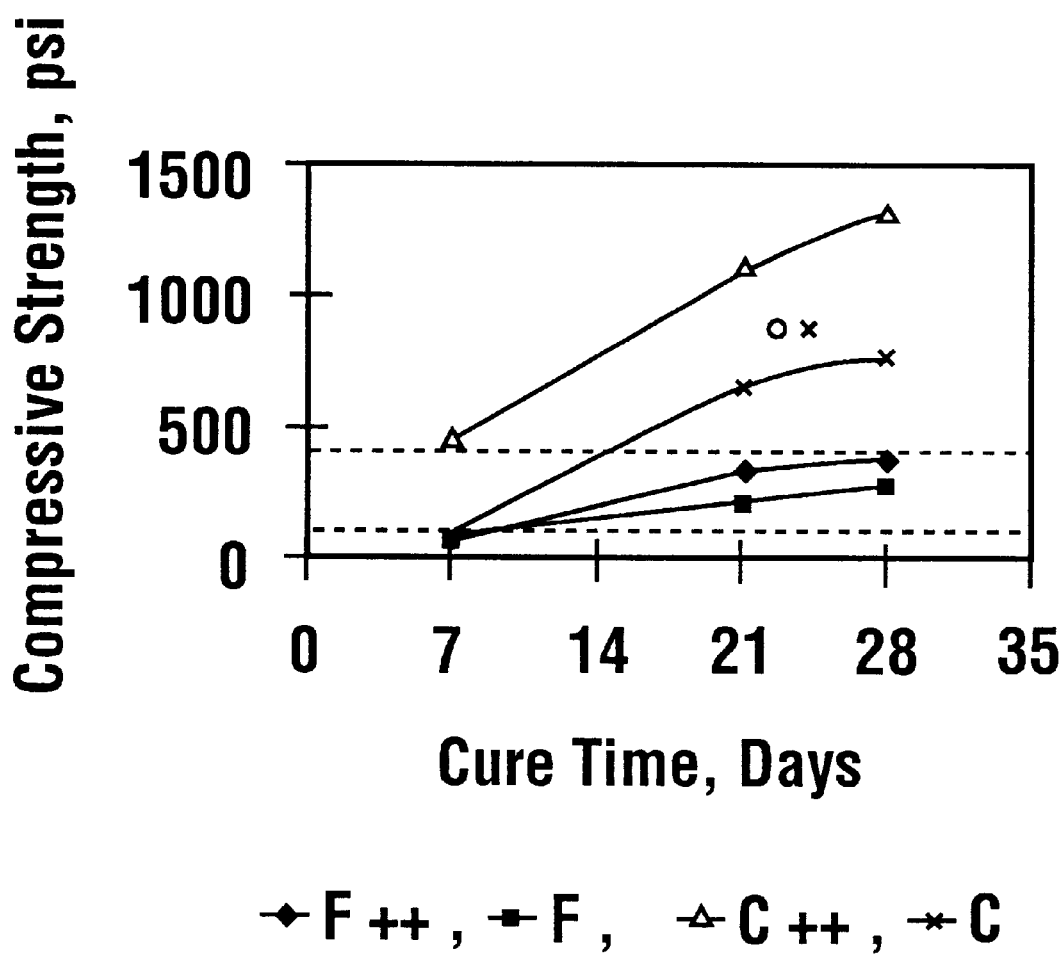
FIG. 1 is a graph of compressive strength versus cure time for a typical CLSM of the invention.

The lime-based CLSM mixtures of the invention contain the following ingredients arranged in a pourable mix which develops specified strengths:

A lime component: Hydrated lime slurry preferred or CaO quicklime, dolomitic lime, MgO quicklime, $Mg(OH)_2$ or $Ca(OH)_2$ hydrated lime, which could be between 0 and 50% of the mixture by weight (5–15% preferred).

A pozzolanic component: Fly Ash or other acceptable pozzolan, which could represent 0–50% of the mixture by weight (10–45% preferred).

Aggregate; either crushed or harvested rock or mineral material or removed soil, which could represent 20–95% of the mixture by weight (50–70% preferred).

Water, which could be 0–50% of the mixture by weight (10–20% preferred).

Optionally, a Water-reducing agent.

Optionally, an Air-entraining agent.

Test results indicate that the CLSMs of the invention match the engineering stiffness and compressive strength properties of equivalent Portland cement-based mixtures. Placing or pouring cement-based materials in confined spaces, like narrow trenches, has always come with the risk of premature set, or hardening, of the trench fill. Once some of the fill hardens, placing fill in the rest of the cavity becomes much more difficult. Under these circumstances, the prematurely set fill has to be removed at considerable loss of time and labor. These equivalent properties come in a mixture which is more forgiving to the placing contractor than Portland cement-based mixtures as there is little risk of early or flash set.

The lime-based CLSMs of the invention with their liquid consistency, forgiving handling characteristics, and strength gaining properties permit the following applications heretofore unavailable with lime in soil, or other mixtures or processes:

(1) gravity-driven, self-leveling placement about any shape or application;

(2) suitable wearing strength for overlying superstructure or pavements or other wearing course;

(3) replacement of Portland cement for trench or structural fill mixtures, a scarce material in some markets;

(4) homogenous and consistent mechanical properties exceeding those of lime-soil mixtures.

Additionally, this process retains some favorable characteristics of other lime-soil or lime/fly ash-soil mixtures:

(1) the removal of the placed and cured material should the need to repair any adjacent or attached material arise;

(2) increased working time for the constructing operation;

(3) the extended practical use of fly ashes, a byproduct material of powder coal combustion.

The lime component of the formulation can basically be any reactive calcareous component containing calcium and/or magnesium oxide or hydroxide or other form of chemically combined calcium or magnesium which, under the conditions employed in the steps of the method, react with the other siliceous and aluminous components of the formulations to form calcium, aluminous silica hydrates.

The preferred reactive calcareous component is either high calcium quicklime or $Ca(OH)_2$ hydrated lime. The high calcium quicklime, CaO, useful in the present invention has a CaO content of greater than about 90% by weight, preferably greater than about 95% by weight. The reactive calcareous component is preferably present in the formulation from about 0 to 50% by weight of the total composition, preferably about 5 to 15% by weight, based on the weight of the total formulation including water. The lime component can be provided as dry, powdered quicklime (CaO) which is mixed with the other components mentioned above to form a flowable product, or can be provided in the form of a hydrated lime slurry prepared in a "PORTABATCH" device of the type available from the assignee of the present invention. Any other batch or process mixer can be utilized to provide a self-flowable slurry or liquid consistency material suitable for gravity placement.

While dry, powdered quicklime (CaO) or $Ca(OH)_2$ hydrated lime are preferred lime components, other reactive components containing calcium and/or magnesium oxide or hydroxide can be utilized for the purposes of the present invention including dolomitic lime, MgO quicklime or $Mg(OH)_2$ hydrated lime.

The pozzolanic component of the mineral formulation is a reactive siliceous aluminous component which is employed in the range from about 0 to 50% by weight of the total composition, preferably about 10 to 45% by weight of the total formulation including water. Such reactive siliceous-aluminous components include artificial or natural pozzolans, pulverized fuel ash (fly ash), granulated slag, pumice dust, ground silica, clays such as bentonite or kaolinite, kiln dust and others, as well as mixtures thereof having a pozzolanic character. By "pozzolan" is meant a finely divided material rich in silica or alumina which will react at ordinary temperatures with hydrated lime in the presence of water to form cementitious products. The preferred siliceous aluminous component is a fly ash. Fly ash is a commercially available product which is familiar to those skilled in the art and is obtained, for example, as a byproduct of coal combustion. Preferably, the fly ash used in the products of the invention should meet the requirements of ASTM C618, Type C or Type F fly ash. In some instances, the flowable fill compositions of the invention can be prepared by utilizing a high-lime content fly ash as an ingredient in a mixture containing no additional lime component.

The aggregate component of the flowable fill compositions can conveniently be provided as crushed or harvested rock or mineral material or, in some cases, removed soil. The aggregate content of the flowable fill mixture is preferably about 20–95% by weight of the total mixture, most preferably about 50–70% by weight, including water.

Water is preferably present in an amount sufficient to make a flowable slurry, generally about 0–50% by weight of the total mixture, most preferably about 10–20% by weight. Optional ingredients include conventional water reducing agents and air-entraining agents such as conventionally used in the concrete industry. Other bulk fill materials such as native soil, select fill or such bulk materials as bottoms ash, amorphous silica or silica flour.

The flowable compositions can conveniently be prepared by slaking a quicklime (CaO) component in about one half of the total water required. Next the fly ash component is added. The aggregate can then be combined into the mixture with the remaining water and any other desired water-reducing additives. Preferably, the lime component is present in an amount affective to completely react with the fly ash components so that no unreacted material remains which would be subject to weathering. The amount of water added is sufficient to make a medium, viscous slurry which can be pumped to the desired location.

The ingredients can be mixed in a batch or continuous process mixer until they have achieved a self-flowable or liquid consistency suitable for gravity placement. A suitable process mixer is shown, for example, in U.S. Pat. No. 4,464,353, issued Aug. 7, 1984, and assigned to the assignee of the present invention.

The lime-based CLSM will acquire strength with time after an initial set period as presented in FIG. 1. In one preferred application, the CLSM of the invention is applied to an opening in the earth such as a trench dug to receive a water or sewage pipeline. The mixture featured in FIG. 1 is 9% hydrated lime, 17% Class C or F fly ash (as defined by ASTM C618), 58% aggregate, 15% water, and 1% chemical admixtures. The "F" and "C" datasets are denoted by the type of fly ash contained in the formulation per ASTM C618. The "++" notation on the graph represents the use of chemical accelerants to increase the rate of the strength gaining reaction. In some cases, Portland cement can be added in minor amounts as an accelerant. A preferred accelerant would be caustic soda, NaOH.

An invention has been provided with several advantages. The lime-based CLSM is a flowable pozzolanic strength gaining mixture which can be substituted for cement-based products in applications requiring low-to-intermediate strength and liquid placement. Lime-based CLSMs are less expensive than concrete equivalents with equal strength and otherwise indistinguishable mechanical performance in service. Additionally, lime-based pozzolanic mixtures are known throughout the industry to offer self-healing capabilities which reduce the effects of cracking and extend service life.

While the invention has been shown in only one of its forms, it is not thus limited but is susceptible to various changes and modifications without departing from the spirit thereof.

What is claimed is:

1. A flowable fill composition, comprising:

from about 1 to 15% by weight of a lime component;

from about 10 to 45% by weight of a pozzolanic material comprising a reactive siliceous aluminous component;

from about 20 to 95% by weight of a crushed rock or soil aggregate material;

from about 10 to 20% by weight water;

wherein all weight percentages are percent by weight of the total flowable fill composition including water; and wherein the composition is a premixed flowable liquid;

the composition being further characterized as having a compressive strength of 2000 psi or less and by the substantial absence of cement or other self-setting adhesive components.

2. The composition of claim 1, comprising:

about 5 to 15% by weight hydrated lime;

about 10 to 45% by weight type C or type F fly ash;

about 50 to 70% by weight crushed rock or soil aggregate;

about 10 to 20% water;

wherein all weight percentages are percent by weight of the total flowable fill composition including water;

and wherein the amount of water added is chosen to allow the mixture to set gradually over a period of several days;

the composition being further characterized as having a compressive strength of 1200 psi or less and by the substantial absence of cement or other self-setting adhesive components.

3. The composition of claim 2, wherein the composition comprises:

1 to 9% hydrated lime;

approximately 17% type F or type C fly ash;

approximately 58% crushed rock or soil aggregate;

approximately 15% water; and approximately 1%, water-reducing additives.

4. A method of producing and placing a flowable fill material in an opening in the earth, the method comprising the steps of:

preparing a flowable fill material by mixing together lime, fly ash, aggregate and water in portions of approximately 5 to 15% by weight lime, 10 to 45% by weight fly ash, 50 to 70% by weight aggregate and 10 to 20% by weight water and placing the flowable fill material so produced in the opening in the earth while it is still in the flowable state; and wherein the flowable fill material so produced is characterized by the substantial absence of cement or other self-setting adhesive components.

5. The method of claim 4, wherein the flowable fill material so produced is characterized as having a set compressive strength after 28 days of 2000 psi or less.

6. The method of claim 4, wherein the opening in the earth is a trench for containing a section of pipe and wherein the flowable composition is placed in the trench in the flowable state and allowed to at least partly set prior to laying the section of pipe.

7. The method of claim 6, wherein the fill material is mixed at a site remote from the site where it is to be utilized, is transported to the site where it is to be utilized and is then placed in an earthen trench.

8. The method of claim 6, wherein the components are mixed in either a batch or continuous process mixer present at the site where the flowable fill material is to be utilized.

9. The method of claim 4, wherein the flowable fill material is mixed in a continuous process mixer which includes a horizontally oriented mixing apparatus having an inlet, an outlet and an internal auger.

10. The method of claim 4, wherein the opening in the earth is an underground mine and the flowable fill is used as a structural backfill in the underground mine.

11. The method of claim 4, wherein the flowable fill has a controlled compressive strength such that the strength can be chosen before preparing the composition and the relative weight percentages of components adjusted, the compressive strength being customized to the strength requirement of the opening being filled.

* * * * *